US009372085B2

(12) United States Patent
Donadel et al.

(10) Patent No.: US 9,372,085 B2
(45) Date of Patent: Jun. 21, 2016

(54) MICROELECTROMECHANICAL SENSOR WITH DIFFERENTIATED PERFORMANCES AND METHOD OF CONTROLLING A MICROELECTROMECHANICAL SENSOR

(71) Applicant: STMicroelectronics S.r.l., Agrate Brianza (IT)

(72) Inventors: Andrea Donadel, Meda (IT); Tommaso Ungaretti, Pavia (IT); Andrea Visconti, Varese (IT); Carlo Caminada, Pregnana Milanese (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 845 days.

(21) Appl. No.: 13/648,218

(22) Filed: Oct. 9, 2012

(65) Prior Publication Data

US 2013/0033274 A1    Feb. 7, 2013

Related U.S. Application Data

(63) Continuation of application No. 13/558,261, filed on Jul. 25, 2012, now abandoned.

(30) Foreign Application Priority Data

Jul. 28, 2011    (IT) .............................. TO2011A0687

(51) Int. Cl.
*G01C 19/56*    (2012.01)
*G01C 19/5712*   (2012.01)
*G01C 19/5719*   (2012.01)

(52) U.S. Cl.
CPC ........ *G01C 19/5712* (2013.01); *G01C 19/5719* (2013.01)

(58) Field of Classification Search
CPC ........... G01C 19/5712; G01C 19/5726; G01C 19/5776; G01P 15/125
USPC .................................. 73/504.12, 510, 514.32
See application file for complete search history.

(56) References Cited

U.S. PATENT DOCUMENTS

| 6,925,876 B2 * | 8/2005 | Babala ...................... 73/504.02 |
| 7,694,563 B2 | 4/2010 | Durante et al. |
| 2010/0132463 A1 | 6/2010 | Caminada et al. |

FOREIGN PATENT DOCUMENTS

JP    2006/292469 A    10/2006

OTHER PUBLICATIONS

Wahyudi et al., "Inertial Measurement Unit Using Multigain Accelerometer Sensor and Gyroscope Sensor," *2011 International Conference on Electrical Engineering and Informatics*, Jul. 17-19, Banduhg, Indonesia, 2011, 5 pages.

*Primary Examiner* — John Chapman, Jr.
(74) *Attorney, Agent, or Firm* — Seed IP Law Group PLLC

(57) ABSTRACT

A microelectromechanical sensor includes a supporting structure and a sensing mass, which is elastically coupled to the supporting structure, is movable with respect thereto with one degree of freedom in response to movements according to an axis and is coupled to the supporting structure through a capacitive coupling. A sensing device senses, on terminals of the capacitive coupling, transduction signals indicative of displacements of the first sensing mass according to the degree of freedom. The sensing device includes at least one first reading chain, having first operative parameters, one second reading chain, having second operative parameters different from the first operative parameters, and one selective electrical connection structure that couples the first reading chain and the second reading chain to the first terminals.

18 Claims, 5 Drawing Sheets

MICROELECTROMECHANICAL SENSOR WITH DIFFERENTIATED PERFORMANCES AND METHOD OF CONTROLLING A MICROELECTROMECHANICAL SENSOR

BACKGROUND

1. Technical Field

The present disclosure relates to a microelectromechanical sensor with differentiated performances and to a method of controlling a microelectromechanical sensor.

2. Description of the Related Art

As is known, the use of microelectromechanical systems (MEMS) has become increasingly widespread in various sectors of technology and has yielded encouraging results especially in the production of inertial sensors, microintegrated gyroscopes, and electromechanical oscillators for a wide range of applications.

MEMS of this type are usually based upon microelectromechanical structures comprising at least one mass coupled to a fixed body (stator) by springs and movable with respect to the stator according to pre-set degrees of freedom. The movable mass and the stator are capacitively coupled through a plurality of respective comb-fingered electrodes facing one another so as to form capacitors. The movement of the movable mass with respect to the stator, for example on account of an external stress, modifies the capacitance of the capacitors, whence it is possible to trace back to the relative displacement of the movable mass with respect to the fixed body and hence to the force applied. Conversely, by supplying appropriate biasing voltages, it is possible to apply an electrostatic force to the movable mass to set it in motion. Furthermore, to obtain electromechanical oscillators the frequency response of the inertial MEMS structures is exploited, which is typically of a second-order low-pass type, with a resonance frequency.

In particular, MEMS gyroscopes have a more complex electromechanical structure, which comprises two masses that are movable with respect to the stator and coupled together so as to have a relative degree of freedom. The two movable masses are both capacitively coupled to the stator. One of the masses is dedicated to driving and is kept in oscillation at the resonance frequency. The other mass is drawn along in the oscillatory (translational or rotational) motion and, in the event of rotation of the microstructure with respect to a pre-set gyroscopic axis with an angular velocity, is subject to a Coriolis force proportional to the angular velocity itself. In practice, the mass drawn along, which is capacitively coupled to the fixed body through electrodes, as the driving mass, operates as an accelerometer that enables sensing of the Coriolis force and acceleration and hence tracing back to the angular velocity.

Notwithstanding the increasingly wide diffusion, the possibilities of exploiting MEMS inertial sensors are limited by a certain rigidity of use of the individual device. In particular, the performance in terms of sensitivity, scale, and noise rejection cannot be modified and hence each sensor can be used for a single application.

On the other hand, the need for a flexible single sensor is extremely felt in modern electronics. For instance, in portable electronic devices, especially in cell phones, numerous functions are based upon inertial sensors. More and more frequently, in fact, these devices include filming functions (image stabilization), display functions (orientation of images on the screen), game functions (where the device itself is used as controller), monitoring or emergency functions (sensing of free fall or impact), and auxiliary functions (pedometer), which are available thanks to the inertial sensors or in any case could benefit from of their use.

Each function, however, can have different types of performance. For instance, for image stabilization the devices should accurately detect very small movements, linked to the natural trembling of the user's hands. Instead, to sense impact that is potentially harmful for the device it is sufficient to recognize in a rather rough way that acceleration thresholds have been exceeded, and the influence of the noise is negligible. On the other hand, the time dedicated to image stabilization is generally limited and hence the power consumption is a secondary parameter. Many monitoring and emergency functions, instead, are performed continuously as long as the device is functioning. Consequently, to prevent severe limitation of autonomy, the reduction of the consumption levels is essential. Again, different types of performance can be used also by one and the same application. A videogame could, for example, privilege fine control of the movement in some steps and rapidity at the expense of the precision in others. Another field where different types of performance is used is the so-called enhanced reality, especially in applications dedicated to portable devices such as cell phones or palmtop computers. In this case, there is the need to sense macroscopic movements of the controller (for example, the cell phone itself) and, at the same time, perform functions of image stabilization.

It would hence be desirable to be able to use MEMS inertial sensors in a more flexible way.

BRIEF SUMMARY

The present disclosure is to provide a microelectromechanical sensor and a method of controlling a microelectromechanical sensor that is free from the limitations described and, in particular, enables a flexible use of the device.

According to the present disclosure, a microelectromechanical sensor and a method of controlling a microelectromechanical sensor are provided. One embodiment includes, a microelectromechanical sensor having a supporting structure and a first sensing mass, elastically coupled to the supporting structure, movable with respect to the supporting structure according to a first degree of freedom, in response to movements of the supporting structure according to a first axis, and coupled to the supporting structure through a first capacitive coupling variable as a function of a relative position of the first sensing mass with respect to the supporting structure. The sensor includes a sensing device, configured to sense, at first terminals of the first capacitive coupling, transduction signals indicative of displacements of the first sensing mass according to the first degree of freedom and to convert the transduction signals into measurement signals. The sensing device includes a first reading chain having first operative parameters, a second reading chain having second operative parameters different from the first operative parameters, and a selective electrical connection structure configured to couple the first reading chain and the second reading chain to the first terminals.

BRIEF DESCRIPTION OF THE SEVERAL VIEWS OF THE DRAWINGS

For a better understanding of the disclosure, some embodiments thereof will now be described, purely by way of non-limiting example and with reference to the attached drawings, wherein.

DETAILED DESCRIPTION

Figure 1:
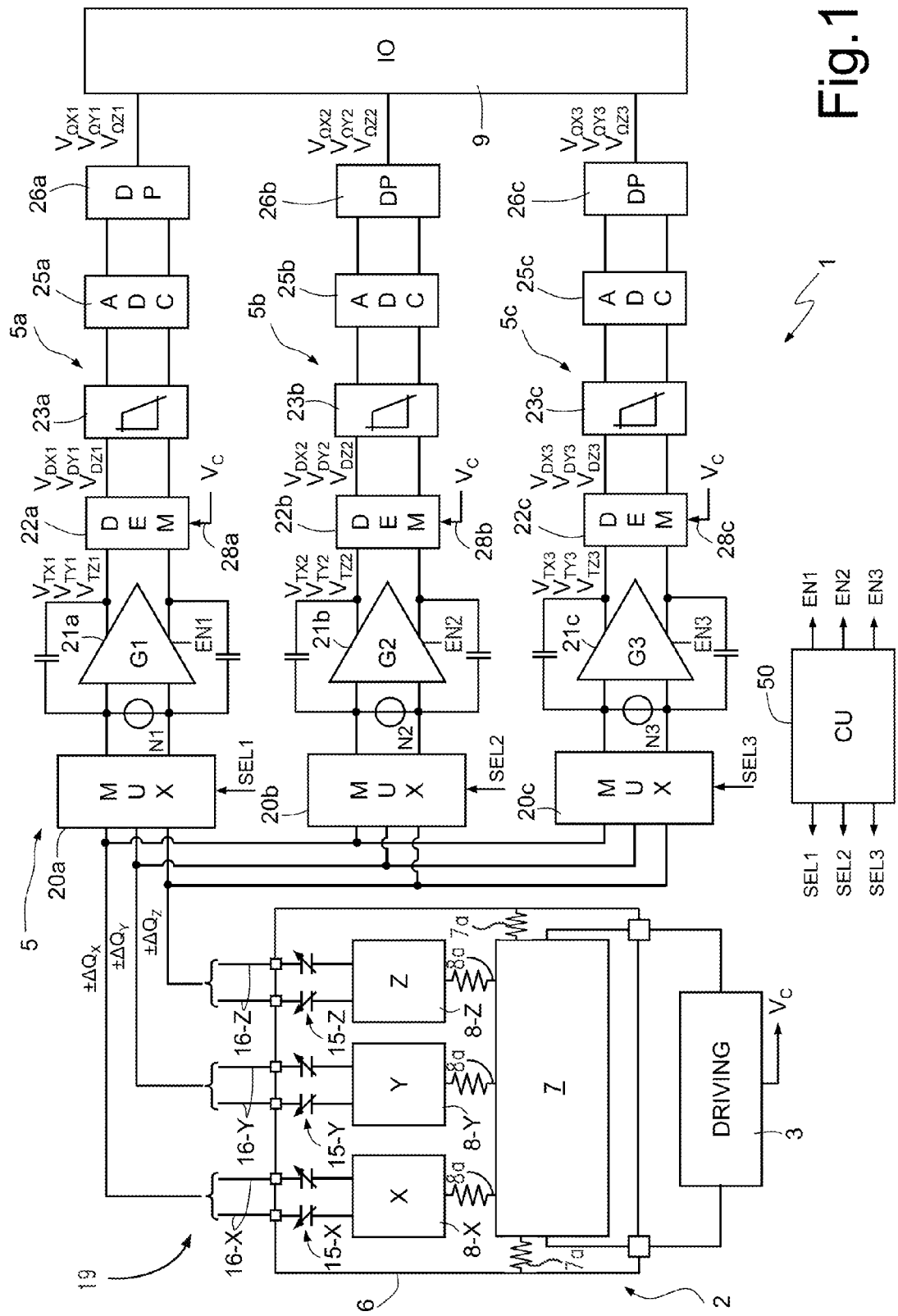
FIG. 1 is a simplified block diagram of a microelectromechanical sensor, in particular a microelectromechanical gyroscope, in accordance with one embodiment of the present disclosure.

FIG. 1 is a schematic illustration of a triaxial microelectromechanical gyroscope 1 in accordance with one embodiment of the disclosure. The gyroscope 1 comprises a microstructure 2, a driving device 3, a sensing device 5, and a control unit 50.

The microstructure 2 is, for example, of the type described in detail in the published European patent application No. EP-A-1 832 841 and in the corresponding U.S. Pat. No. 7,694,563 and comprises a fixed structure 6, a driving mass 7, and three systems of sensing masses 8-X, 8-Y, 8-Z. In FIG. 1, however, the microstructure 2 is represented only schematically, for reasons of simplicity.

The driving mass 7 is elastically coupled by suspensions 7a to the fixed structure 6 so as to be able to oscillate in a plane XY about a resting position according to one degree of freedom, in this case rotational.

With reference to the movements of the driving mass 7 and of the sensing mass 8-X, 8-Y, 8-Z, moreover, the expression "according to an axis" will now be used to indicate movements along an axis or about an axis, according to whether the movements allowed for the masses by the respective degrees of freedom are translational or else rotational, respectively. Likewise, the expression "according to one degree of freedom" will be used to indicate translational or rotational movements, as allowed by said degree of freedom.

The sensing masses 8-X, 8-Y, 8-Z are mechanically coupled to the driving mass 7 so as to be drawn along in motion according to the rotational degree of freedom of the driving mass 7 itself. Furthermore, the sensing masses 8-X, 8-Y, 8-Z are elastically coupled to the driving mass 7 with elastic suspensions 8a so as to oscillate in turn with respect to the driving mass 7 itself, with a respective further translational or rotational degree of freedom, in response to rotations of the microstructure 2 about respective mutually perpendicular sensing axes X, Y, Z.

Figure 2:
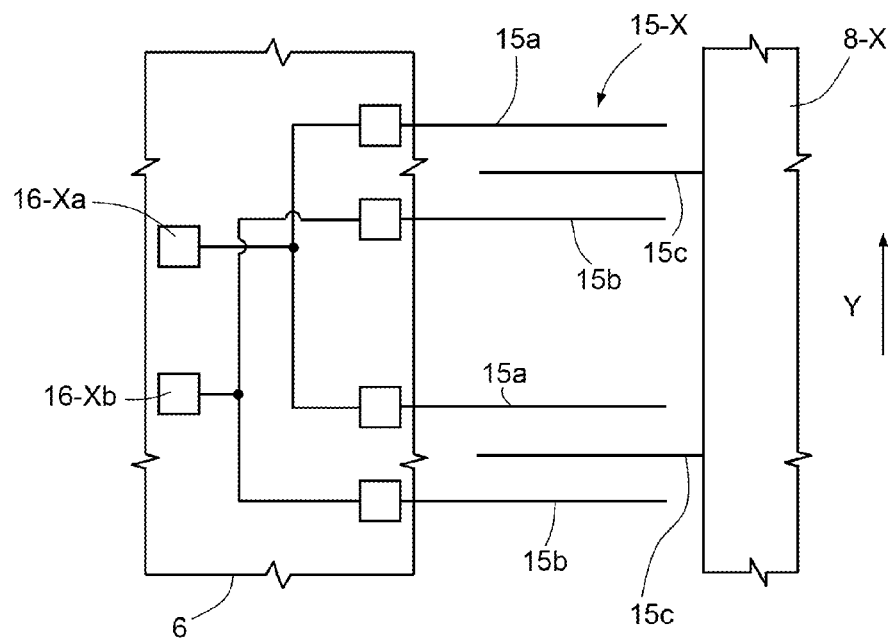
FIG. 2 is a top plan view of an enlarged detail of the sensor of FIG. 1.

The sensing masses 8-X, 8-Y, 8-Z are capacitively coupled to the fixed structure 6 through respective sets of sensing electrodes (sensing units) 15-X, 15-Y, 15-Z (here not illustrated individually and represented schematically as capacitors), coupled to respective pairs of sensing terminals 16-X, 16-Y, 16-Z. The sets of sensing electrodes 15-X, 15-Y, 15-Z are shaped in such a way that the capacitive coupling is of a differential type. As illustrated in FIG. 2, which regards in particular the sensing mass 8-X, the sets of sensing electrodes 15-X, 15-Y, 15-Z comprise fixed sensing electrodes 15a, 15b, anchored to the fixed structure 6, and movable sensing electrodes 15c.

Each sensing mass 8-X, 8-Y, 8-Z is provided with respective movable sensing electrodes 15c, which are set between respective fixed sensing electrodes 15a, 15b (only the sensing mass 8-X is illustrated in FIG. 2, for reasons of simplicity). Furthermore, the fixed sensing electrodes 15a of the sensing units 15-X, 15-Y, 15-Z are electrically coupled to respective terminals of the pairs of sensing terminals 16-X, 16-Y, 16-Z, and the fixed sensing electrodes 15b of the sensing units 15-X, 15-Y, 15-Z are electrically coupled to further respective terminals of the pairs of sensing terminals 16-X, 16-Y, 16-Z.

In this case, the capacitive coupling is obtained through parallel plate electrodes, perpendicular to the axis Y. The coupling is moreover of a differential type and is determined by the relative position of the sensing masses 8-X, 8-Y, 8-Z with respect to the fixed structure 6. Consequently, differential transduction signals $\pm \Delta Qx$, $\pm \Delta Qy$, $\pm \Delta Qz$ sensed on the sensing terminals 16-X, 16-Y, 16-Z are indicative of the capacitive coupling and hence of the relative position of the sensing masses 8-X, 8-Y, 8-Z with respect to the fixed structure 6, which in turn is indicative of the angular velocity of the fixed structure 6 with respect to the axis Y.

The driving device 3 is coupled to the microstructure 2 so as to form, with the driving mass 7, a microelectromechanical loop 19. The driving device 3 is configured so as to keep the microelectromechanical loop 19 in oscillation with controlled amplitude, at a driving frequency $\omega_D$ close to the resonance frequency $\omega_R$ of the mechanical system defined by the driving mass 7 (with the sensing mass 8) coupled to the fixed structure 6. In addition, the driving device 3 supplies a carrier signal $V_C$ of a frequency equal to the driving frequency $\omega_D$ and in phase with the oscillations of the microelectromechanical loop 19.

The sensing device 5 comprises, in the embodiment described herein, three reading chains 5a, 5b, 5c, coupled in parallel to all the sensing terminals 16-X, 16-Y, 16-Z, and an output interface 9. The reading chains 5a, 5b, 5c are selectively activatable and deactivatable by respective enable signals EN1, EN2, EN3 supplied by the control unit 50.

Each reading chain 5a, 5b, 5c comprises a respective multiplexer 20a, 20b, 20c, a respective read interface 21a, 21b, 21c, a respective demodulator 22a, 22b, 22c, a respective low-pass filter 23a, 23b, 23c, a respective analog-to-digital converter 25a, 25b, 25c, and a respective digital-processing module 26a, 26b, 26c. It is in any case understood that this gyroscope can advantageously be used in analog devices.

Hereinafter, reference will be made for reasons of simplicity to the reading chain 5a, while it is meant that the reading chains 5b, 5c are structurally similar, except for what is specified hereinafter as regards operative parameters of the components and control of the multiplexers 20a, 20b, 20c.

The read interface 21a is a fully differential switched-capacitor charge amplifier and has a gain G1.

The read interface 21a is selectively connectable in turn to the sensing terminals 16-X, 16-Y, 16-Z through the multiplexer 20a, which is controlled by a selection signal SEL1 supplied by the control unit 50. The read interface 21a receives from the sensing terminals 16-X, 16-Y, 16-Z electrical sensing signals (charge packets in the embodiment described) and converts them into respective integrated transduction signals $V_{TX1}$, $V_{TY1}$, $V_{TZ1}$. The enable signal EN1 enables activation and deactivation of the read interface 21a and the other components of the reading chain 5a.

The demodulator 22a receives in cyclic succession the integrated transduction signals $V_{TX1}$, $V_{TY1}$, $V_{TZ1}$ from the read interface 21a. Furthermore, a demodulation input 28a of the demodulator 22a is coupled to the driving device 3 to receive the carrier signal $V_C$. The integrated transduction signals $V_{TX1}$, $V_{TY1}$, $V_{TZ1}$ are demodulated using the carrier signal $V_C$. On the output of the demodulator 22 there are hence cyclically present demodulated signals $V_{DX1}$, $V_{DY1}$, $V_{DZ1}$ (in other words, the signal present on the output of the demodulator 22 cyclically represents the movements of the sensing masses 8-X, 8-Y, 8-Z, which are due to rotations about the axes X, Y, Z, respectively).

The demodulated signals $V_{DX1}$, $V_{DY1}$, $V_{DZ1}$ are then filtered by the low-pass filter 23a, digitized by the analog-to-digital converter 25a, and processed numerically by the digital-processing module 26a.

Further operative parameters of the low-pass filter 23a and of the analog-to-digital converter 25a determine the performance of the reading chain 5a. Both the low-pass filter 23a and the analog-to-digital converter 25a can introduce respective components of gain (possibly unit components of gain), which, with the gain G1 of the read interface, fix the scale of measurement for the reading chain 5a. In addition, the same components concur in defining the frequency band of the reading chain 5a and introduce components of noise. The noise components of the entire reading chain 5a are conveniently represented by a noise generator at input to the read interface 21a and are designated herein by N1.

The digital-processing module 26a processes the demodulated signals $V_{DX1}$, $V_{DY1}$, $V_{DZ1}$ after digitization, for the application for which the reading chain 5a is used. In one embodiment, the digital-processing module 26a presents to the output interface 9 angular-velocity signals $V_{\Omega X1}$, $V_{\Omega Y1}$, $V_{\Omega Z1}$ representing first measurements of the angular velocity of the microstructure 6 about the axes X, Y, Z, respectively.

As mentioned previously, the reading chains 5b, 5c have the same structure as that described for the reading chain 5a. In particular, the read interface 21b of the reading chain 5b supplies integrated transduction signals $V_{TX2}$, $V_{TY2}$, $V_{TZ2}$, which are demodulated, filtered, digitized, and processed by the demodulator 22b, by the low-pass filter 23b, by the analog-to-digital converter 25b, and by the digital-processing module 26b, to produce angular-velocity signals $V_{\Omega X2}$, $V_{\Omega Y2}$, $V_{\Omega Z3}$, representing second measurements of the angular velocity of the microstructure 6 about the axes X, Y, Z, respectively, and the read interface 21c of the reading chain 5c supplies integrated transduction signals $V_{TX3}$, $V_{TY3}$, $V_{TX3}$, which are demodulated, filtered, digitized, and processed by the demodulator 22c, by the low-pass filter 23c, by the analog-to-digital converter 25c, and by the digital-processing module 26c, to produce angular-velocity signals $V_{\Omega X3}$, $V_{\Omega Y3}$, $V_{\Omega Z3}$ representing third measurements of the angular velocity of the microstructure 6 about the axes X, Y, Z, respectively.

However, the three reading chains 5a, 5b, 5c are distinguished by the characteristics of their components, which determine the types of performance and the scale of measurement. For instance, the reading chains 5b, 5c have respective gains G2, G3. In the same way, also the low-pass filters 23b, 23c and the analog-to-digital converters 25b, 25c can introduce respective gain components.

All the elements of the reading chains 5b, 5c define the respective overall bands and introduce noise components N2, N3, which are here represented as noise generators at input to the respective read interfaces 21b, 21c. The operative parameters of the three reading chains 5a, 5b, 5c (in particular, overall gain, band, and noise at input) are different, in such a way that also the types of performance will be different.

The reading chains 5a, 5b, 5c can be used simultaneously, managing the connection to the sensing terminals 16-X, 16-Y, 16-Z by means of the multiplexers 20a, 20b, 20c as described hereinafter.

Figure 3:
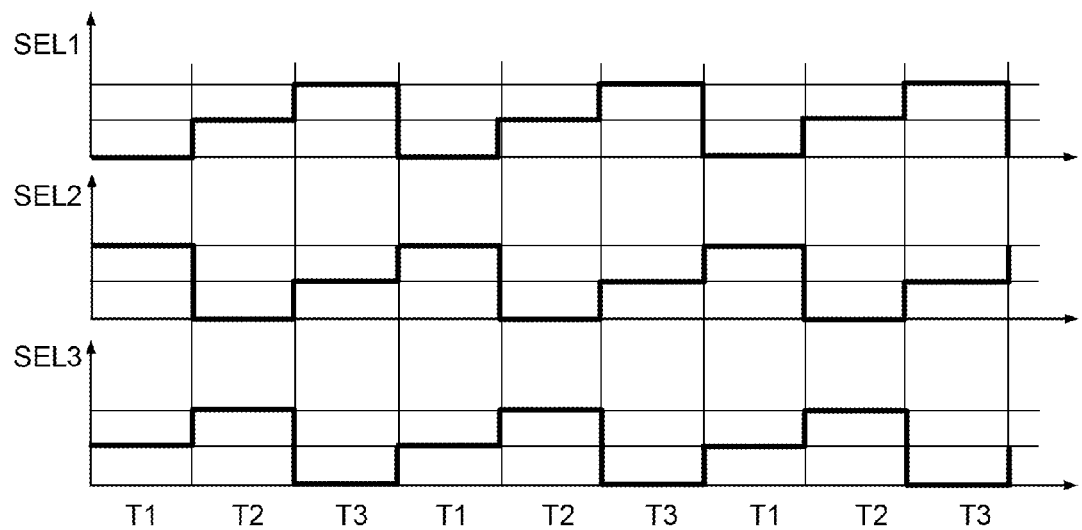
FIG. 3 is a graph regarding signals used in the gyroscope of FIG. 1.

The multiplexers 20a, 20b, 20c are controlled by the control unit 50 through the selection signals SEL1, SEL2, SEL3, respectively. As illustrated in FIG. 3, the selection signals SEL1, SEL2, SEL3 have three values SX, SY, SZ, which enable the connection of the respective reading chain to the sensing terminals 16-X, 16-Y, 16-Z, respectively. Furthermore, the selection signals SEL1, SEL2, SEL3 assume in turn the values SX, SY, SZ and, at each instant, are different from one another. For instance, in a time interval T1 the selection signals SEL1, SEL2, SEL3 have the values SX, SZ, SY, respectively, and hence the read interfaces 21a, 21b, 21c are respectively coupled to the sensing terminals 16-X, 16-Z, 16-Y. In an interval T2 consecutive to the interval T1, the selection signals SEL1, SEL2, SEL3 have the values SY, SX, SZ, respectively, and in an interval T3 consecutive to the interval T2, the selection signals SEL1, SEL2, SEL3 have the values SZ, SY, SX, respectively. In this way, the simultaneous connection of two reading chains to a single pair of sensing terminals 16-X, 16-Y, 16-Z, which would produce unpredictable effects, is prevented.

In an alternative embodiment, the three multiplexers 20a, 20b, 20c are replaced by a single multiplexer that connects the read interfaces 21a, 21b, 21c to the sensing terminals 16-X, 16-Y, 16-Z substantially according to the same criterion already described.

The device described enables use of a single microelectromechanical structure for different applications that have types of performance that differ from one another. For instance, by selecting the operative parameters (in particular gains, band, and noise referred to the input) it is possible to have available readings on a different scale and to optimize the performance according to the applications. The choice of the operative parameters allows for precision, in particular as far as noise rejection is concerned, and also allows for varying consumption levels. In fact, low noise sensitivity and high consumption levels correspond to high currents in the read interfaces. On the contrary, if the currents in the read interfaces are low, the noise sensitivity is more marked, but the consumption levels are lower.

Furthermore, in the embodiment described the different types of performance of the reading chains can be exploited for applications to be performed simultaneously (as a main application and a hidden or background application), because the reading chains can access the sensing terminals in time division.

Figure 4:
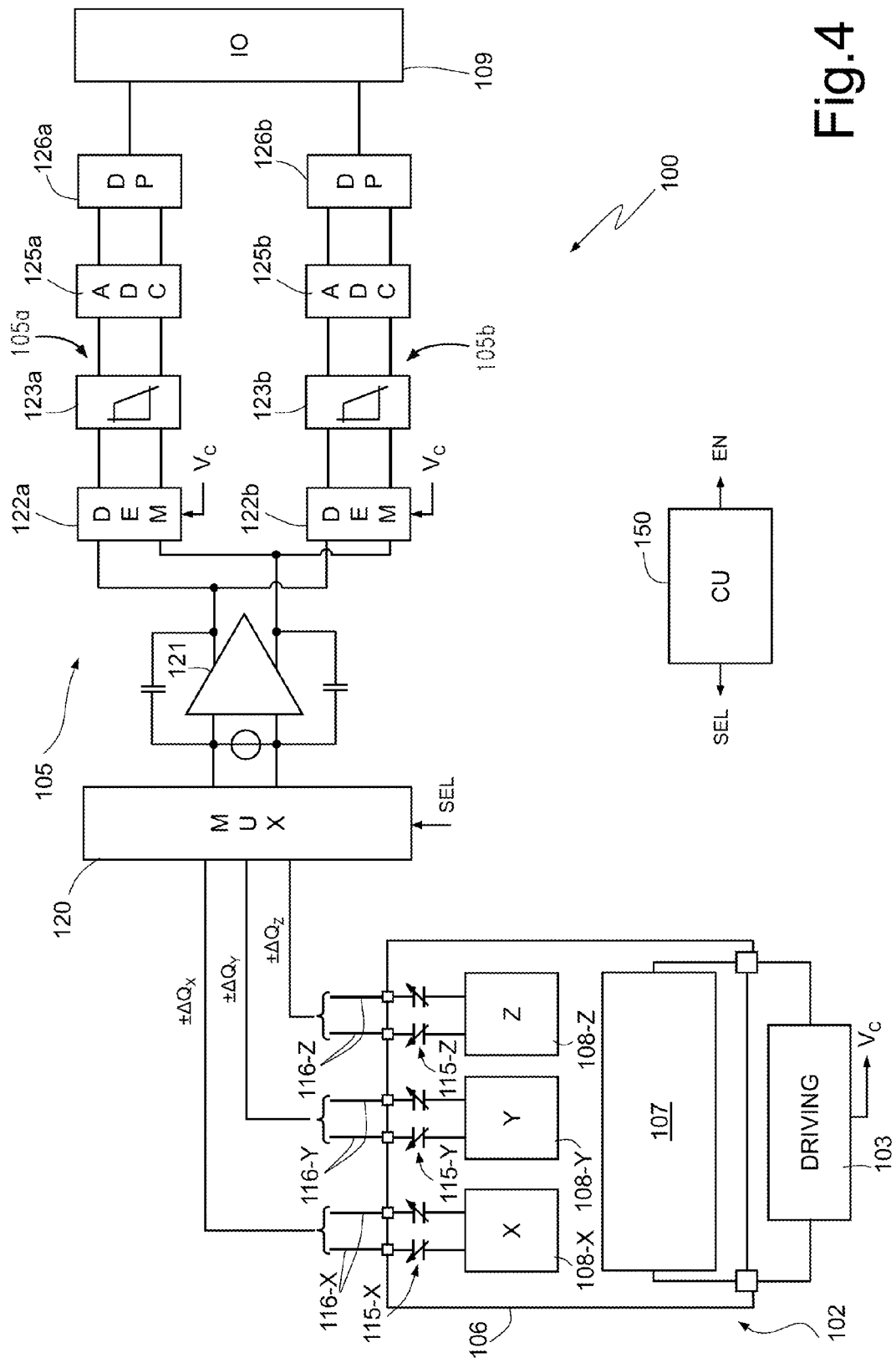
FIG. 4 is a simplified block diagram of a microelectromechanical sensor, in particular a microelectromechanical gyroscope, in accordance with a different embodiment of the present disclosure.

FIG. 4 illustrates a different embodiment of the disclosure. In this case, a gyroscope 100 comprises a microstructure 102 and a driving device 103, substantially as already described with reference to FIG. 1. The gyroscope 100 further comprises a sensing device 105, a multiplexer 120, an output interface 109, and a control unit 150.

The sensing device 105 comprises a read interface 121 and two reading chains 105a, 105b, both coupled to outputs of the read interface 121.

The read interface 121 is a fully differential switched-capacitor charge amplifier and has inputs selectively connectable to sensing terminals 116-X, 116-Y, 116-Z of the microstructure 102 through the multiplexer 120. For this purpose, the multiplexer 120 is controlled by the control unit 150 through a selection signal SEL in such a way that the inputs of the read interface 121 are coupled to the sensing terminals 116-X, 116-Y, 116-Z in turn.

In the embodiment of FIG. 4, the two reading chains 105a, 105b comprise respective demodulators 122a, 122b, respective low-pass filters 123a, 123b, respective analog-to-digital converters 125a, 125b, and respective digital-processing modules 126a, 126b.

Figure 5:
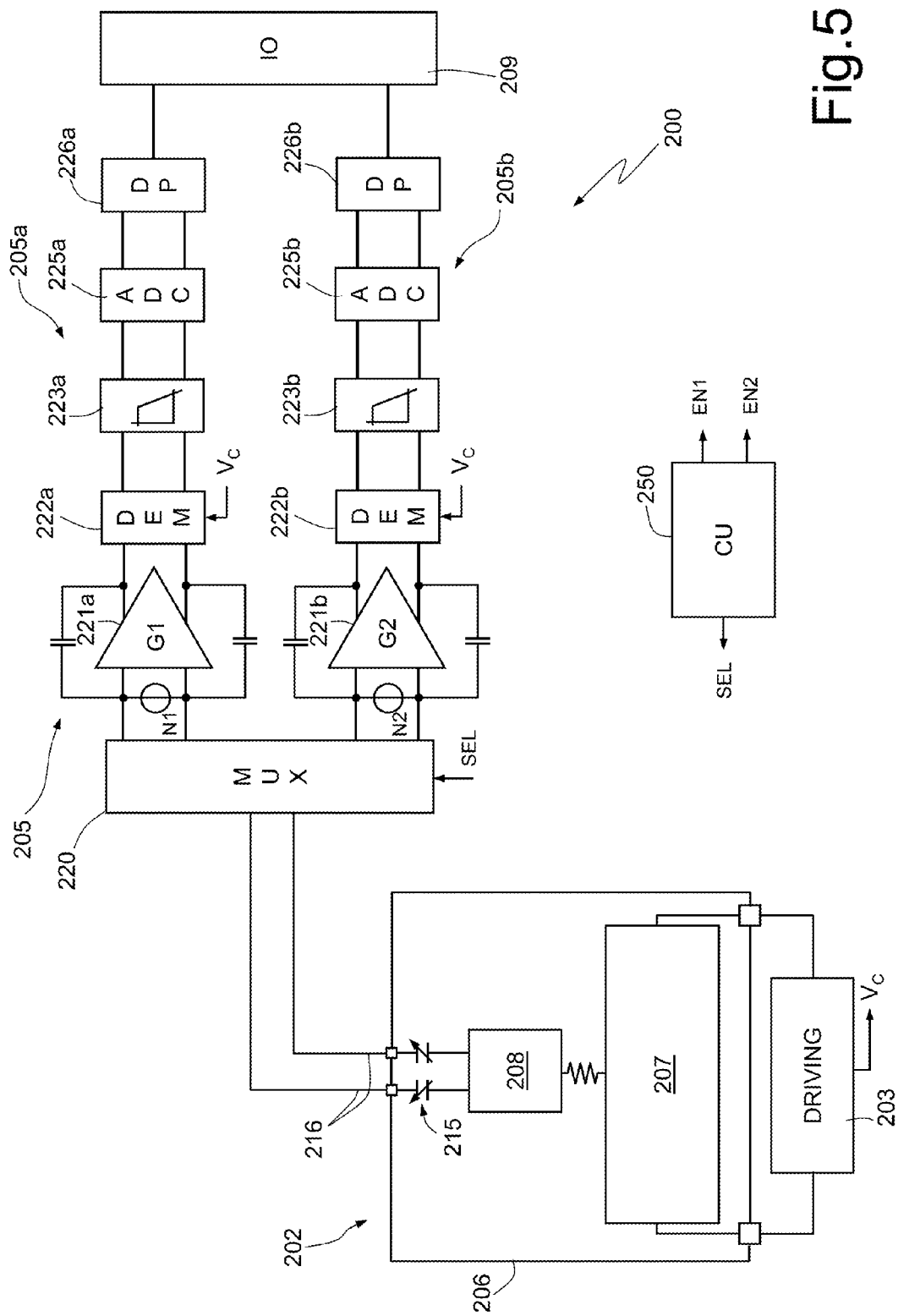
FIG. 5 is a simplified block diagram of a microelectromechanical sensor, in particular a microelectromechanical gyroscope, in accordance with a further different embodiment of the present disclosure.

FIG. 5 illustrates a uniaxial microelectromechanical gyroscope 200, which comprises a microstructure 202, a driving device 203, a sensing device 205, an output interface 209, and a control unit 250.

The microstructure 202, represented only schematically in FIG. 5, comprises a fixed structure 206, a driving mass 207, and a sensing mass 208.

The driving mass 207 is elastically coupled, by suspensions (not illustrated), to the fixed structure 206 so as to be able to oscillate in a plane about a resting position according to one degree of freedom, in this case rotational. The sensing mass 208 is mechanically coupled to the driving mass 207 so as to be drawn along in motion according to the rotational degree of freedom of the driving mass 207 itself.

Furthermore, the sensing mass 208 is elastically coupled to the driving mass 207 so as to oscillate in turn with respect to the driving mass 207 itself, with a respective further translational or rotational degree of freedom, in response to rotations of the microstructure 202 about a sensing axis.

The sensing mass 208 is capacitively coupled in a differential way to the fixed structure 206 through sensing electrodes 216 (here not illustrated individually and represented schematically as capacitors), coupled to a pair of sensing terminals 216. The sensing electrodes 216 are shaped in such a way that, in the presence of an electrical signal on the sensing terminals 216, the sensing mass 208 is subject to electrostatic forces according to the respective degree of freedom.

The sensing device 205 comprises two reading chains 205a, 205b alternatively connectable to outputs of the microstructure 202 through a multiplexer 220, controlled by the control unit 250 through a selection signal SEL.

The control unit 250 moreover generates enable signals EN1, EN2, which have an activation value and a deactivation value, alternatively for activation and deactivation of the reading chains 205a, 205b, respectively.

In greater detail, the reading chains 205a, 205b comprise respective read interfaces 221a, 221b, respective demodulators 222a, 222b, respective low-pass filters 223a, 223b, respective analog-to-digital converters 225a, 225b, and respective digital-processing modules 226a, 226b. The read interfaces 221a, 221b receive the enable signals EN1, EN2 from the control unit 250 and are preferably deactivated when they are not coupled to the microstructure 202.

In one embodiment not illustrated, the multiplexer 220 is absent, and simultaneous connection of the reading chains 205a, 205b to the microstructure 202 is prevented by configuring the control unit 250 in such a way that in any circumstance at least one of the enable signals EN1, EN2 has the deactivation value.

In this way, it is possible to use a number of reading chains greater than the number of sensing masses, and hence a number of functions that have different performances of the gyroscope can be provided.

Figure 6:
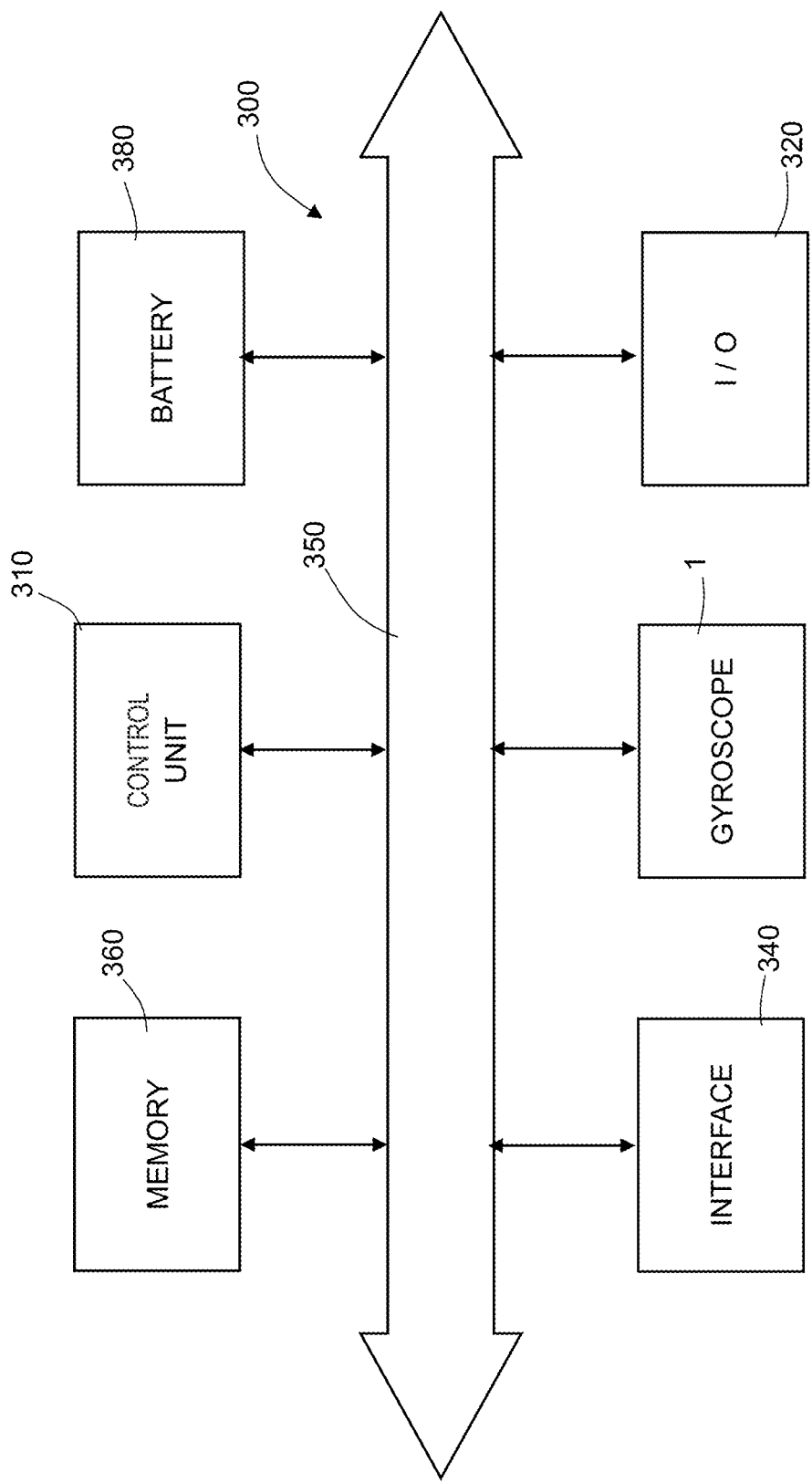
FIG. 6 is a simplified block diagram of an electronic system incorporating a microelectromechanical sensor according to one embodiment of the present disclosure.

FIG. 6 illustrates a portion of an electronic system 300 in accordance with an embodiment of the present disclosure. The system 300 incorporates the gyroscope 1 and can be used in devices such as, for example, a palmtop computer (personal digital assistant, PDA), a laptop or portable computer, possibly with wireless capacity, a cell phone, a messaging device, a digital music player, a digital camera, or other devices designed to process, store, transmit, or receive information. For instance, the gyroscope 1 can be used in a digital camera to sense movements and carry out an image stabilization. In a further embodiment, the gyroscope 1 is included in a user interface activated by movement for computers or a console for videogames. In a further embodiment, the gyroscope 1 is incorporated in a satellite navigation device and is used for temporary position tracking in the event of loss of the satellite positioning signal.

The electronic system 300 may comprise a controller 310, an input/output (I/O) device 320 (for example, a keyboard or a screen), the gyroscope 1, a wireless interface 340, and a memory 360 of a volatile or nonvolatile type, coupled together through a bus 350. In one embodiment, a battery 380 may be used to supply the system 300. It is to be noted that the scope of the present disclosure is not limited to embodiments having necessarily one or all of the devices listed.

The controller 310 may comprise, for example, one or more microprocessors, microcontrollers, and the like.

The I/O device 320 may be used to generate a message. The system 300 may use the wireless interface 340 to transmit and receive messages to and from a wireless communication network with a radiofrequency (RF) signal. Examples of wireless interface may comprise an antenna, a wireless transceiver, such as a dipole antenna, although the scope of the present disclosure is not limited from this standpoint. Furthermore, the I/O device 320 may supply a voltage representing what is stored either in the form of digital output (if digital information has been stored) or in the form of analog information (if analog information has been stored).

Modifications and variations may be made to the device and method described herein, without thereby departing from the scope of the present disclosure.

In particular, the disclosure can advantageously be used for microelectromechanical sensors different from the gyroscopes described herein, such as for example microelectromechanical accelerometers with any structure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical sensor, comprising:
 a supporting structure;
 a first sensing mass, elastically coupled to the supporting structure, movable with respect to the supporting structure according to a first degree of freedom, in response to movements of the supporting structure according to a first axis, and coupled to the supporting structure through a first capacitive coupling variable as a function of a relative position of the first sensing mass with respect to the supporting structure;
 a second sensing mass, elastically coupled to the supporting structure, movable with respect to the supporting structure according to a second degree of freedom, in response to movements of the supporting structure according to a second axis, and coupled to the supporting structure through a second capacitive coupling variable as a function of a relative position of the second sensing mass with respect to the supporting structure, the second capacitive coupling having second terminals;

a sensing device, configured to sense, at first terminals of the first capacitive coupling, transduction signals indicative of displacements of the first sensing mass according to the first degree of freedom and to convert the transduction signals into measurement signals,
the sensing device, including:
a first reading chain having first operative parameters;
a second reading chain having second operative parameters different from the first operative parameters; and
a selective electrical connection structure configured to alternatively couple the first reading chain and the second reading chain to the first terminals and the second terminals, the selective electrical connection structure configured to prevent the first reading chain and the second reading chain from being simultaneously coupled to the first terminals or to the second terminals.

2. The sensor according to claim 1 wherein the selective electrical connection structure is configured to couple alternatively the first reading chain and the second reading chain to the first terminals.

3. The sensor according to claim 1 wherein the first reading chain comprises a first reading interface having a first gain, a first frequency band, and a first input noise and the second reading chain comprises a second reading interface having a second gain, a second frequency band, and a second input noise.

4. The sensor according to claim 3 wherein the selective electrical connection structure is configured to couple alternatively the first reading interface and the second reading interface to the first terminals.

5. The sensor according to claim 1, comprising a reading interface coupled to the first reading chain and to the second reading chain.

6. The sensor according to claim 1 wherein the first reading chain includes a first demodulator, a first low-pass filter, and a first processing module and the second reading chain includes a second demodulator, a second low-pass filter and a second processing module.

7. The sensor according to claim 1 wherein a number of reading chains is not greater than a number of sensing masses.

8. The sensor according to claim 1 wherein the selective electrical connection structure is configured to couple alternatively and in turn the first reading chain and the second reading chain to the first terminals and to the second terminals.

9. The sensor according to claim 1 wherein the selective electrical connection structure comprises a selection stage arranged between the first terminals and the second terminals on one side and the first reading chain and the second reading chain on the other side.

10. The sensor according to claim 1 wherein selective electrical connection structure selectively activates and deactivates the first reading chain and the second reading chain.

11. An electronic system, comprising:
a control unit;
a microelectromechanical sensor coupled to the control unit, the sensor including:
a supporting structure;
a first sensing mass, elastically coupled to the supporting structure, movable with respect to the supporting structure according to a first degree of freedom, in response to movements of the supporting structure according to a first axis, and coupled to the supporting structure through a first capacitive coupling variable as a function of a relative position of the first sensing mass with respect to the supporting structure;
a second sensing mass, elastically coupled to the supporting structure, movable with respect to the supporting structure according to a second degree of freedom, in response to movements of the supporting structure according to a second axis, and coupled to the supporting structure through a second capacitive coupling variable as a function of a relative position of the second sensing mass with respect to the supporting structure, the second capacitive coupling having second terminals;
a sensing device, configured to sense, at first terminals of the first capacitive coupling, transduction signals indicative of displacements of the first sensing mass according to the first degree of freedom and to convert the transduction signals into measurement signals, the sensing device including:
a first reading chain having first operative parameters;
a second reading chain having second operative parameters different from the first operative parameters; and
a selective electrical connection structure configured to couple the first reading chain and the second reading chain to the first terminals and the second terminals, the selective electrical connection structure is configured to couple alternatively and in turn the first reading chain and the second reading chain to the first terminals and to the second terminals.

12. The system according to claim 11 wherein the first reading chain includes a first demodulator, a first low-pass filter, and a first processing module and the second reading chain includes a second demodulator, a second low-pass filter and a second processing module.

13. The system according to claim 11 wherein the first reading chain comprises a first reading interface having a first gain, a first frequency band, and a first input noise and the second reading chain comprises a second reading interface having a second gain, a second frequency band, and a second input noise.

14. The system according to claim 13 wherein the selective electrical connection structure is configured to couple alternatively the first reading interface and the second reading interface to the first terminals.

15. A method, comprising:
sensing transduction signals with a microelectromechanical sensor that has:
a supporting structure; and
a first sensing mass, elastically coupled to the supporting structure, movable with respect to the supporting structure according to a first degree of freedom, in response to movements of the supporting structure according to a first axis, and coupled to the supporting structure through a first capacitive coupling variable as a function of a relative position of the first sensing mass with respect to the supporting structure, the sensing including, sensing at first terminals of the first capacitive coupling, the transduction signals indicative of displacements of the first sensing mass according to the first degree of freedom;
sensing transduction signals with a second sensing mass of the sensor that is elastically coupled to the supporting structure, movable with respect to the supporting structure according to a second degree of freedom, in response to movements of the supporting structure according to a second axis, and coupled to the supporting structure through a second capacitive coupling variable as a function of a relative position of the second sensing mass with respect to the supporting structure, the sensing including sensing at second terminals of the second capacitive coupling the transduction signals indicative of displacements of the second sensing mass according to the second degree of freedom;

coupling to the first terminals a first reading chain having first operative parameters and a second reading chain having second operative parameters different from the first operative parameters, the coupling including coupling alternatively and in turn the first reading chain and the second reading chain to the first terminals and to the second terminals; and converting the transduction signals into measurement signals.

16. The method according to claim 15, further comprising alternatively coupling the first reading chain and the second reading chain to the first terminals.

17. A method, comprising:
sensing transduction signals with a microelectromechanical sensor that has:
   a supporting structure; and
   a first sensing mass, elastically coupled to the supporting structure, movable with respect to the supporting structure according to a first degree of freedom, in response to movements of the supporting structure according to a first axis, and coupled to the supporting structure through a first capacitive coupling variable as a function of a relative position of the first sensing mass with respect to the supporting structure, the sensing including, sensing at first terminals of the first capacitive coupling, the transduction signals indicative of displacements of the first sensing mass according to the first degree of freedom;

sensing transduction signals with a second sensing mass of the sensor that is elastically coupled to the supporting structure, movable with respect to the supporting structure according to a second degree of freedom, in response to movements of the supporting structure according to a second axis, and coupled to the supporting structure through a second capacitive coupling variable as a function of a relative position of the second sensing mass with respect to the supporting structure, the sensing including sensing at second terminals of the second capacitive coupling the transduction signals indicative of displacements of the second sensing mass according to the second degree of freedom coupling to the first terminals a first reading chain having first operative parameters and a second reading chain having second operative parameters different from the first operative parameters;

converting the transduction signals into measurement signals; and preventing the first reading chain and the second reading chain from being simultaneously coupled to the first terminals or to the second terminals.

18. The method of claim 17, further comprising alternatively coupling the first reading chain and the second reading chain to the first terminals.

* * * * *